United States Patent
Solanyk

(10) Patent No.: US 11,407,530 B2
(45) Date of Patent: Aug. 9, 2022

(54) SENSOR SHIFT FOR REMOTE SENSING

(71) Applicant: DIGITALGLOBE, INC., Westminster, CO (US)

(72) Inventor: Victor Solanyk, Longmont, CO (US)

(73) Assignee: DigitalGlobe, Inc., Westminster, CO (US)

(*) Notice: Subject to any disclaimer, the term of this patent is extended or adjusted under 35 U.S.C. 154(b) by 0 days.

(21) Appl. No.: 16/804,315

(22) Filed: Feb. 28, 2020

(65) Prior Publication Data
US 2020/0407081 A1 Dec. 31, 2020

Related U.S. Application Data

(63) Continuation of application No. 15/825,478, filed on Nov. 29, 2017, now Pat. No. 10,577,131.

(51) Int. Cl.
| | |
|---|---|
| *H04N 5/232* | (2006.01) |
| *B64G 1/10* | (2006.01) |
| *B64G 1/36* | (2006.01) |
| *H04N 3/14* | (2006.01) |
| *G01C 11/02* | (2006.01) |
| *G01S 3/786* | (2006.01) |
| *G01C 11/06* | (2006.01) |
| *H04N 5/341* | (2011.01) |

(52) U.S. Cl.
CPC ........... *B64G 1/1021* (2013.01); *B64G 1/361* (2013.01); *G01C 11/02* (2013.01); *G01C 11/06* (2013.01); *G01S 3/7865* (2013.01); *H04N 3/1587* (2013.01); *H04N 5/3415* (2013.01); *B64G 2001/1028* (2013.01)

(58) Field of Classification Search
CPC ...... B64G 1/1021; B64G 1/361; G01C 11/02; G01S 3/7865; H04N 3/1587
USPC ............................................... 348/169
See application file for complete search history.

(56) References Cited

U.S. PATENT DOCUMENTS

| | | |
|---|---|---|
| 10,577,131 B2 | 3/2020 | Solanyk |
| 2010/0235095 A1* | 9/2010 | Smitherman .......... G01S 19/14 701/532 |
| 2011/0297795 A1* | 12/2011 | Jaeger ................... B64G 1/428 244/171.1 |
| 2014/0168434 A1 | 6/2014 | Gerlach |
| 2015/0326769 A1 | 11/2015 | Richarte et al. |

* cited by examiner

*Primary Examiner* — Nguyen T Truong
(74) *Attorney, Agent, or Firm* — Snell & Wilmer L.L.P.

(57) ABSTRACT

Techniques for improving the quality of images captured by a remote sensing overhead platform such as a satellite. Sensor shifting is employed in an open-loop fashion to compensate for relative motion of the remote sensing overhead platform to the Earth. Control signals are generated for the sensor shift mechanism by an orbital motion compensation calculation that uses the predicted ephemeris (including orbit dynamics) and image geometry (overhead platform to target). Optionally, the calculation may use attitude and rate errors that are determined from on-board sensors.

15 Claims, 4 Drawing Sheets

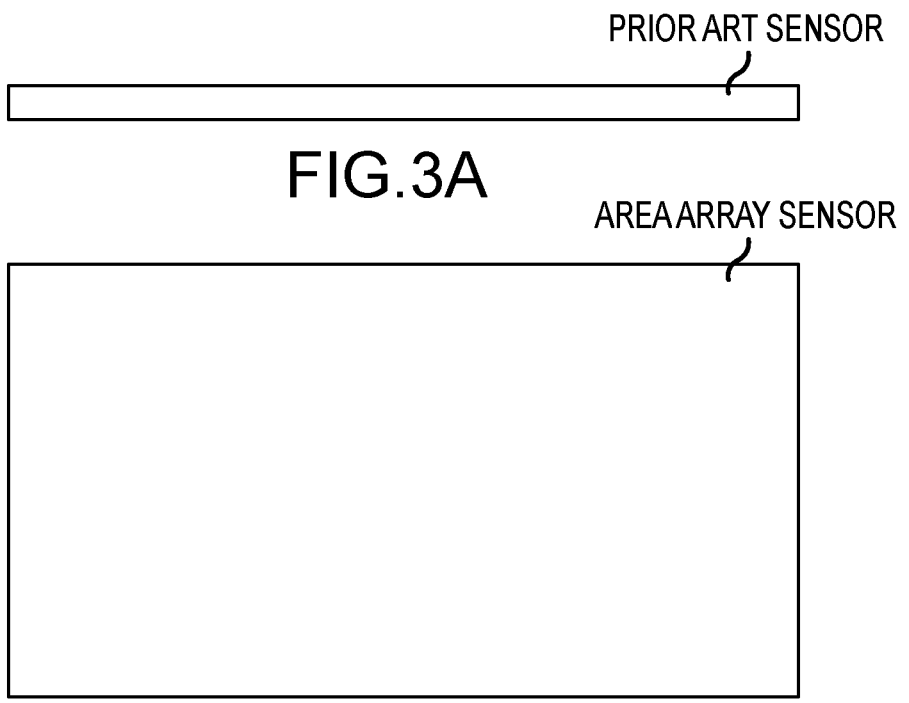
FIG.3A
FIG.3B
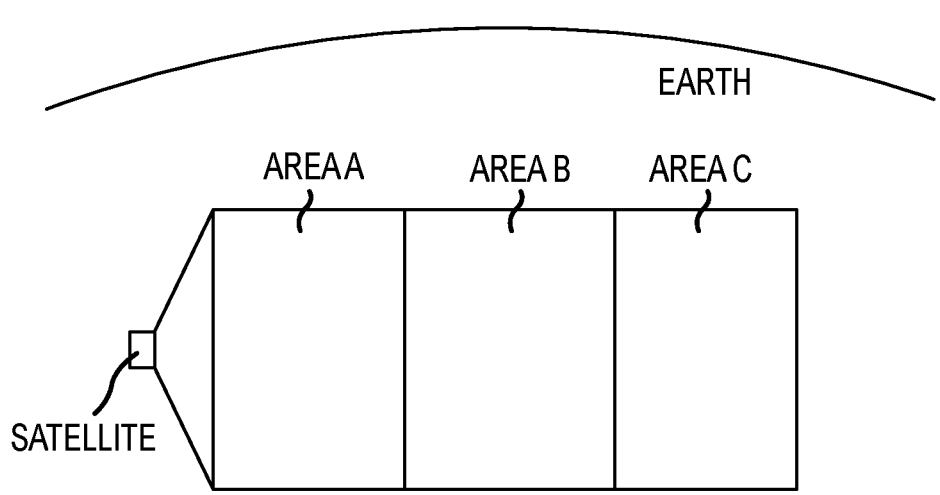
FIG.4

SENSOR SHIFT FOR REMOTE SENSING

CROSS-REFERENCE TO RELATED APPLICATIONS

This patent application is a continuation of U.S. patent application Ser. No. 15/825,478, that was filed on Nov. 29, 2017 (U.S. Pat. No. 10,577,131, issuing Mar. 3, 2020), and the entire disclosure of which is hereby incorporated by reference.

BACKGROUND

The use of satellite-based and aerial-based imagery of the Earth is popular among government and commercial entities. Satellite images may be collected with multiple different sensors (for example in DigitalGlobe's WV-3 satellite) that at any given instant in time view different points on the ground. For example, a satellite may contain many separate sensors that are each line scanners.

Each sensor may have one or more bands (e.g., 3-15 bands). Further, one or more of the sensors may be populated with multispectral VNIR sensors, having a ground resolution of 1.24 meters. VNIR has a fairly standard meaning in the industry of the portion of the electromagnetic spectrum from roughly 400 to 1100 nanometers in wavelength. And multispectral refers to the use of multiple narrower wavelength ranges throughout the range. For example, it might refer to eight specific wavelength bands within the 400-1100 nanometer range (e.g., coastal (approximately 400-452 nm), blue (approximately 448-510 nm), green (approximately 518-586 nm), yellow (approximately 590-630 nm), red (approximately 632-692 nm), red edge (approximately 706-746 nm), near infrared 1 (NIR1) (approximately 772-890 nm), and near infrared 2 (NIR2) (approximately 866-954 nm)). Also, one or more of the bands in one or more of the banks may be populated with panchromatic sensors, having a ground resolution of 0.31 meters. Panchromatic has a fairly standard meaning in the industry of a relatively broad spectral band that may include all or most of the visible spectrum (450 to 700 nanometers) and possibly other regions adjacent to the visible spectrum (e.g., 450 to 800 nanometers). Also, one or more of the bands in may be populated with SWIR sensors, having a ground resolution of 3.7 meters. SWIR has a fairly standard meaning in the industry of the portion of the electromagnetic spectrum from roughly 1100 to 3000 nanometers in wavelength.

Further, the WV-3 satellite uses a line scanner that is thousands of pixels wide and has only a few such rows for each of the panchromatic band, several multispectral (MS) bands, CAVIS bands, and so forth.

With an integrated sensor containing each of these sensors, the integrated sensor field-of-view is typically swept across the Earth's surface in "push broom" fashion. Additionally, the attitude (angular position/orientation) of the satellite may be adjusted to view different areas on the Earth's surface. Necessarily, many if not all of the different viewing angles will be from a non-nadir position.

As described above, the panchromatic and MS bands each have their own section of detectors that simultaneously collect the image. All bands eventually overlay the target area, creating a complete image. The orbital motion of the satellite is factored into the scan profile, which results in an image that covers the target area. Exposure is controlled by the scan rate/line rate as well as the time-delayed-integration, which result in minimal pixel smearing during the scan. Scanning arrays are able to collect a large amount of area in a short time.

Area array image sensors are typically less expensive than line scanner image sensors, and they capture an image of a much larger ground area than image sensors. However, because of the amount of time necessary to transfer all of the image data off of an area array image sensor, and because of the length of time that a given pixel needs to collect photons from the Earth's surface, it has previously not been practical to use area array image sensors for remote sensing from satellites.

These area (or framing) arrays (as what is found in consumer cameras) capture a whole scene in a single snap. They are usually small in image size compared to a line scanner, which collects a longer image. The advantage of area arrays is that: (1) they are cheaper to buy and align in the camera during construction; (2) they are smaller, but useful for small satellites; and (3) all the pixels are aligned with one another, so it is easier to geo-locate the other pixels once one of the pixels is geo-located.

However, proper exposure time is needed. Because of the orbital motion of the satellite, the boresight of the camera has to be steadily maintained on the target during the image for the long-enough exposure, otherwise the image will be smeared.

It is against this background that the improvements disclosed herein have been developed.

SUMMARY

Disclosed herein is a remote sensing overhead platform for imaging an area below the platform. The overhead platform includes a remote sensing overhead platform body; an image sensor positioned on the remote sensing overhead platform body so that the image sensor can be moved relative to the remote sensing overhead platform body in response to control signals; and a controller that provides the control signals to the image sensor for movement relative to the remote sensing overhead platform body, wherein the control signals are based on movement of the remote sensing overhead platform body relative to the area below to be imaged.

The remote sensing overhead platform may be an orbital satellite. The image sensor may be movable in a first plane relative to the remote sensing overhead platform body. The image sensor may be an area array image sensor having a number of rows of pixels that is at least one-tenth of the number of pixels in each row of pixels.

The control signals may be entirely free of being based on image correlation. The control signals may not be based on image correlation. The control signals may be entirely free of being based on any captured image. The control signals may not be based on any captured image.

The image sensor captures an image and wherein the control signals may be based on predicted orbital motion and the location of the image relative to the remote sensing overhead platform. The image sensor may be an area array image sensor having a number of rows of pixels that is at least one-tenth of the number of pixels in each row of pixels and wherein the image sensor may be moved so as to compensate for motion of the remote sensing overhead platform for at least 15 ms.

Also disclosed is an image sensor system carried by a remote sensing overhead platform for imaging an area below the platform. The image sensor system includes an image sensor positioned on the remote sensing overhead platform body so that the image sensor can be moved relative to the remote sensing overhead platform body in response to control signals; and a controller that provides the control signals to the image sensor for movement relative to the remote sensing overhead platform body, wherein the control signals are based on movement of the remote sensing overhead platform body relative to the area below to be imaged.

The image sensor may be movable in a first plane relative to the remote sensing overhead platform body. The image sensor may be an area array image sensor having a number of rows of pixels that is at least one-tenth of the number of pixels in each row of pixels.

The control signals may be entirely free of being based on image correlation. The control signals may not be based on image correlation. The control signals may be entirely free of being based on any captured image. The control signals may not be based on any captured image.

The image sensor captures an image and wherein the control signals may be based on predicted orbital motion and the location of the image relative to the remote sensing overhead platform. The image sensor may be an area array image sensor having a number of rows of pixels that is at least one-tenth of the number of pixels in each row of pixels and wherein the image sensor may be moved so as to compensate for motion of the remote sensing overhead platform for at least 15 ms.

Also disclosed is a remote sensing overhead platform for imaging an area below the platform. The overhead platform includes a remote sensing overhead platform body; an image sensor positioned on the remote sensing overhead platform body so that the image sensor can be moved relative to the remote sensing overhead platform body in response to control signals, wherein the image sensor is movable in a first plane relative to the remote sensing overhead platform body, wherein the image sensor is an area array image sensor having a number of rows of pixels that is at least one-tenth of the number of pixels in each row of pixels; and a controller that provides the control signals to the image sensor for movement relative to the remote sensing overhead platform body, wherein the control signals are based on movement of the remote sensing overhead platform body relative to the area below to be imaged, wherein the control signals are entirely free of being based on image correlation. The image sensor captures an image and wherein the control signals are based on predicted orbital motion and the location of the image relative to the remote sensing overhead platform.

The image sensor may be moved so as to compensate for motion of the remote sensing overhead platform for at least 15 ms.

BRIEF DESCRIPTION OF THE DRAWINGS

The disclosure herein is described with reference to the following drawings, wherein like reference numbers denote substantially similar elements:

FIGS. 3A and 3B show a comparison of an area of ground captured by a line scanner image sensor as compared to an area of ground captured by an area array image sensor.

FIG. 4 is an illustration showing a satellite capturing a series of areas of ground on the Earth with a area array image sensor.

DETAILED DESCRIPTION

Figure 1:
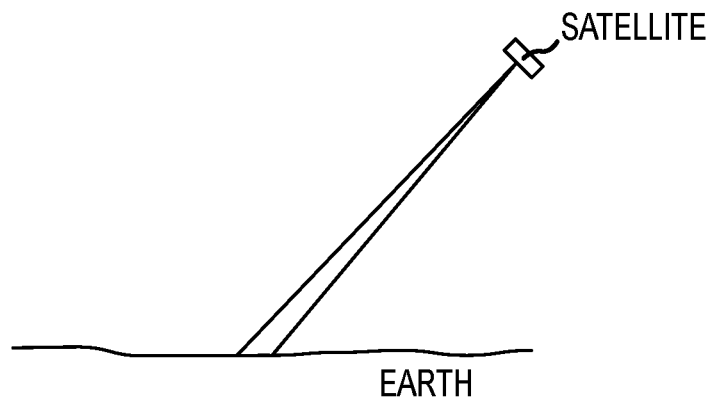
FIG. 1 is an illustration of a satellite capturing an image of a portion of the Earth, the image being captured from a non-nadir position of the satellite.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

This disclosure relates to several aspects for improving techniques for remote sensing from satellites and other above-ground imaging locations using sensor shift technology. Sensor shift is the movement of the electronic image sensor in consumer digital cameras (e.g., in Digital SLRs) to compensate for motion of the camera, such as might be caused by the camera user not holding the camera sufficiently still (such as may occur at long focal lengths). In general, sensor shift may be used as an alternative to, or as an adjunct to other types of optical image stabilization techniques, such as varying the optical path to the sensor such as by moving one or more lens elements in the optical path. But sensor shift can also be used as the sole means of image stabilization.

For example, as taught herein for satellite applications and other remote sensing from an overhead platform applications, sensor shift techniques could be used in order to compensate for orbital motion of the sensing platform (e.g., the satellite) or to compensate for attitude error (movement of the sensing platform due to operations such as slewing the sensing platform to be directed at a particular target or area on the ground).

This technique would use sensor shift to compensate for the predicted orbital motion. By not having to maneuver/re-point the satellite boresight for every adjacent image, one can increase the amount of imagery that can be collected over a short period of time. The shifting sensor can also be used to adjust fine-pointing of the image, rather than relying on the satellite maneuvering to fine-tune the image pointing.

Figure 2:
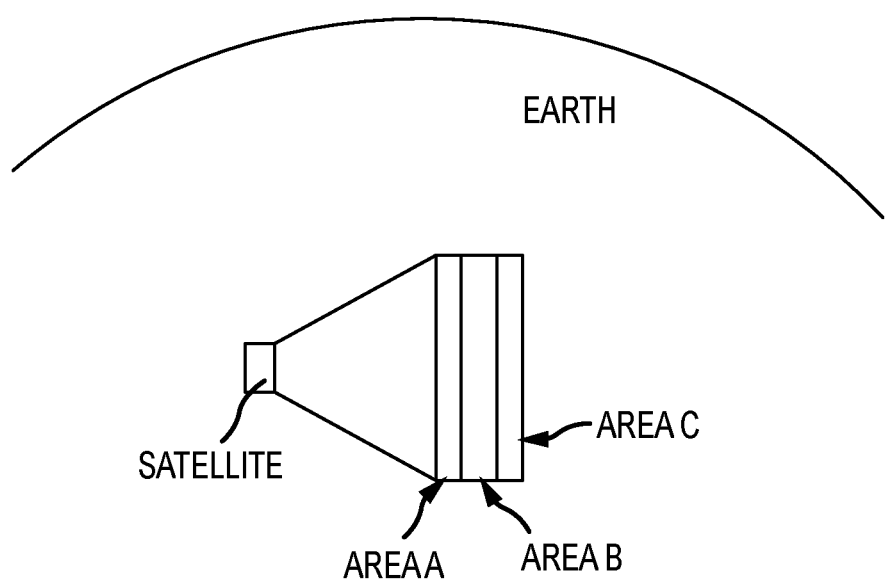
FIG. 2 is an illustration showing a satellite capturing a series of swaths of ground on the Earth with a line scanner image sensor operating in push-broom fashion.

FIG. 1 shows an illustration of a satellite 100 capturing an image of a portion 102 of the Earth. As can be appreciated, the image is being captured from a non-nadir position. The orientation of the satellite 100 relative to the Earth can be changed by the satellite, or it may remain fixed for some portion of time. Further, the images may be captured sequentially as the area on the Earth imaged by the satellite changes in push-broom fashion. This is shown in FIG. 2, where the satellite captures a series of swaths of ground on the Earth with a line scanner image sensor operating in push-broom fashion. Although shown with a line scanner image sensor, a similar approach could be used with an area array image sensor.

FIGS. 3A and 3B show a comparison of an area of ground captured by a line scanner image sensor as compared to an area of ground captured by an area array image sensor. For example, a line scanner image sensor may have 3 to 5 rows of pixels with thousands of pixels in each row. Thus, the "area" imaged by the line scanner image sensor may be in the range of 15 m×45 km. Also, by way of example only, the area array image sensor may include (in the range of) 8,000 rows of pixels with (in the range of) 15,000 pixels in each row. Thus, the "area" imaged by area array image sensor may be in the range of 24 km×45 km. It should be understood that these specific numbers of pixels and specific areas are only examples, and that the techniques taught herein are applicable to other sizes of pixel arrays as well. One parameter that could be used to distinguish an area array from a line scanner might be that with an area array has an aspect ratio no greater than ten to one (10:1), meaning that there are no more than ten times the number of pixels in each row than there are rows of pixels. Stated alternatively, the number of rows of pixels is at least one-tenth (1/10) of the number of pixels in each row.

As a further specific example that is not intended to be limiting to the invention described herein, it may be desirable to allow pixels of an image sensor to collect light from a given target (such as a given area on the surface of the Earth) for 30 milliseconds (ms) in order to capture an image of a desired quality at a particular light level. Further, at a typical orbit speed and altitude for one of DigitalGlobe's satellites, a given spot on the Earth's surface below the satellite may appear to move relative to the satellite at a rate of approximately 7 km/sec. Following along with this example, an image sensor would need to be moved approximately 210 meters to cause the image sensor and the Earth to appear to have no relative movement for the desired 30 ms. In the case of an image sensor with pixels that effectively capture an area on the ground that is 3 meters long, this would require the image sensor to be shifted approximately 70 pixels. This amount of "sensor shift" would amount to less than 1% of either dimension of the 8,000× 15,000 pixel sensor described above. It should be understood that 30 ms is but one example of a desirable exposure time. 15 ms is another example of a desirable exposure time. The actual exposure time needed is a function of the sensor used and the environmental conditions.

FIG. 4 is an illustration showing a satellite capturing a series of areas of ground on the Earth with an area array image sensor. As can be seen, the area array image sensor could capture an image of Area A on the Earth's surface, followed by an image of adjacent Area B on the Earth's surface, followed by an image of adjacent Area C on the Earth's surface. As could be appreciated, Areas A, B, and C could be slightly overlapping, so that Area B includes a small portion that was also imaged by Area A, and Area C includes a small portion that was also imaged by Area B.

Figure 5:
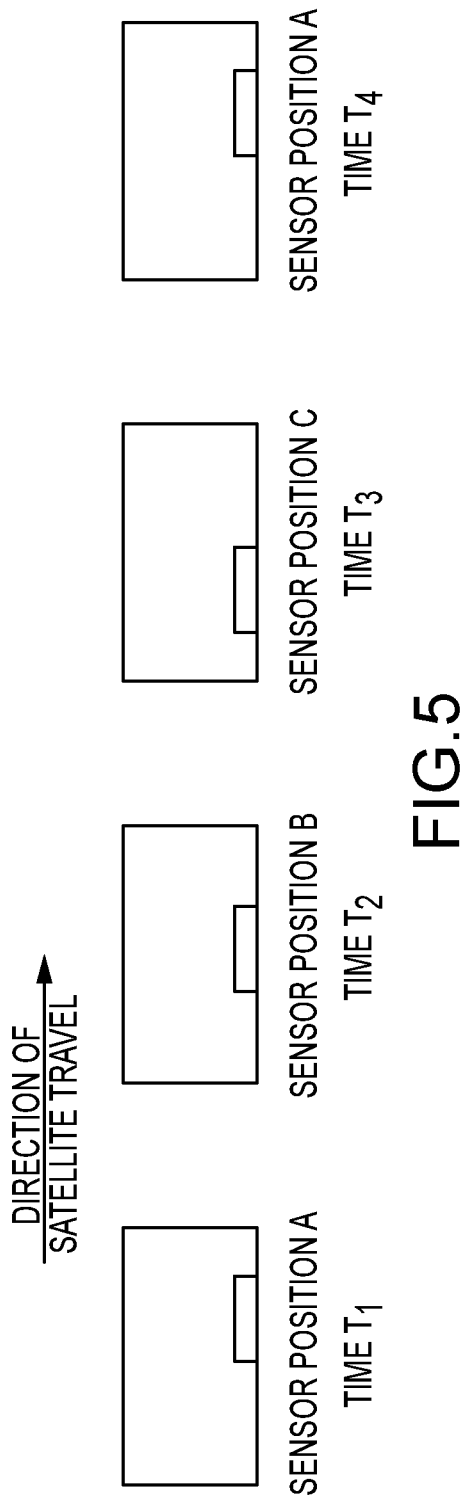
FIG. 5 is an illustration of sensor shift in a remote sensing satellite, where an area array image sensor is continuously shifted to compensate for satellite motion.

FIG. 5 is an illustration of sensor shift in a remote sensing satellite 500, where an area array image sensor 502 is continuously shifted to compensate for satellite motion. As can be seen, at Time $t_1$ the image sensor 502 is in Position A relative to the satellite 500. Later, at Time $t_2$ the image sensor 502 is in Position B relative to the satellite 500. Still later, at Time $t_3$ the image sensor 502 is in Position C relative to the satellite 500. Finally, at Time $t_4$ the image sensor 502 is again in Position A relative to the satellite 500, and the sequence of moving through Positions A, B, and C can be repeated. The intent is that at each of Time $t_1$, Time $t_2$, and Time $t_3$, the image sensor 502 is capturing image data from the same point on the Earth's surface, while at Time $t_4$ the image sensor 502 is capturing image data from a roughly adjacent point on the Earth's surface. It should be understood that this but a very simplified example. For example, the image sensor would likely be moved through many more positions than Positions A, B, and C. As may be appropriate, the image sensor may be moved continuously through a range of positions or moved discretely through multiple positions. Also, it should be understood that the movement of the image sensor may be more complex that simple movement along a single axis (e.g., along an x-axis), such as one might infer from this example. Instead, the sensor may be movable within an x-y plane, both in straight and curved lines within the plane and rotational movement within the plane, and combinations thereof. These types of movement may be beneficial for off-nadir imaging as well as to adjust for attitude errors during imaging.

Figure 6:
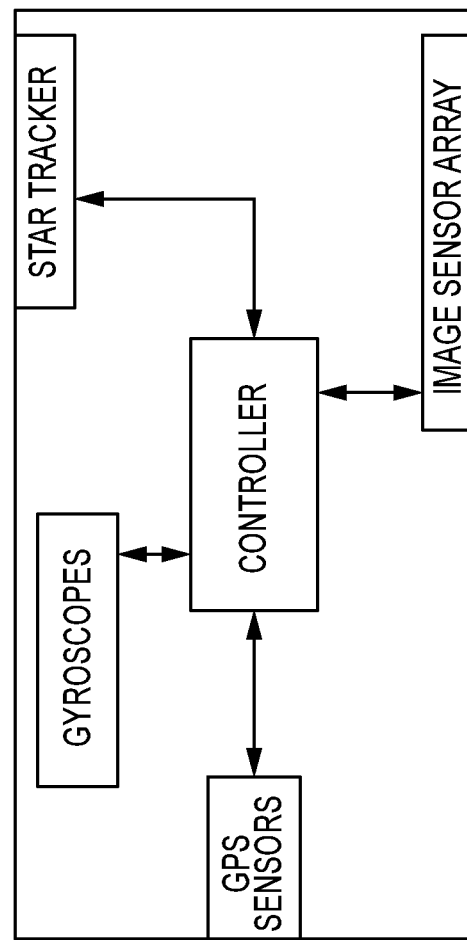
FIG. 6 is a block diagram showing relevant portions of a remote sensing satellite, which employs sensor shift of an area array image sensor.

FIG. 6 is a block diagram showing relevant portions of a remote sensing satellite 600, which employs sensor shift of an area array image sensor 602. As can be seen, the satellite 600 also includes a controller 604 (which may include a single controller or multiple different controllers) and various components for the satellite to use in determining the position and orientation in space of the satellite and the position and orientation of the satellite relative the Earth. These components may include one or more GPS sensors 606, one or more gyroscopes 608, and one or more star trackers 610. As can be appreciated, this block diagram omits numerous conventional satellite components, for ease of illustration and understanding.

Figure 7:
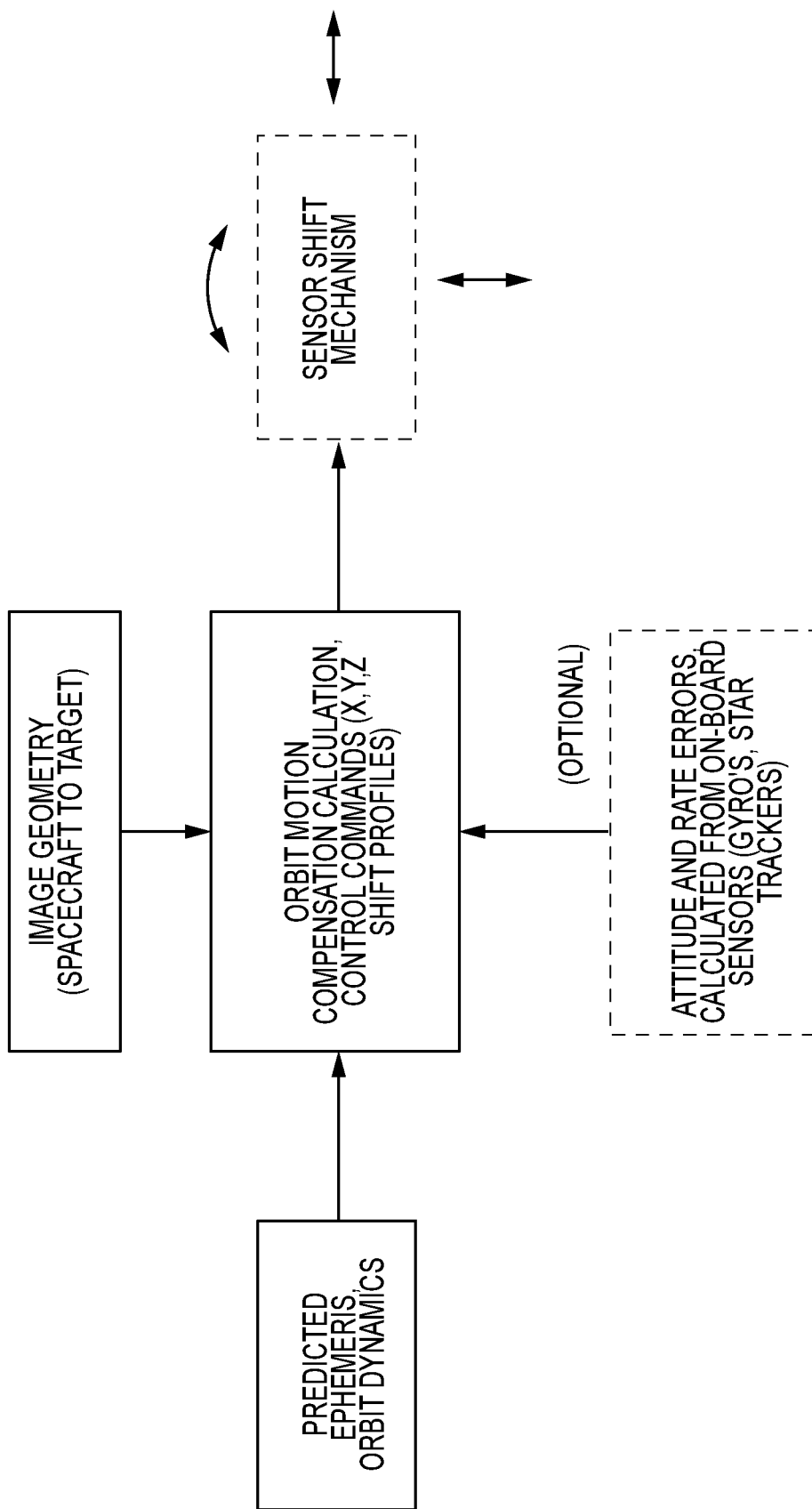
FIG. 7 shows a control structure demonstrating the techniques taught herein.

FIG. 7 shows a control structure 700 demonstrating the techniques taught herein. A sensor shift mechanism 702 is shown to be movable in any one or a combination of an x-direction, a y-direction, and a rotation in the x-y plane. The sensor shift mechanism 702 receives control or movement commands (in the form of x, y, and z shift profiles) from an orbit motion calculation 704. The orbit motion calculation 704 receives the following inputs: image geometry (the satellite to the target portion of the Earth's surface) 706, predicted ephemeris/orbit dynamics 708, and (optionally) attitude and rate errors 710 calculated from on-board sensors (e.g., gyroscopes and star trackers).

While there arguably may have been some use of sensor shifting in satellites, the shifting was controlled with much more expensive and complex techniques which use optical or image correlation or at least use some form of analysis of captured images. The image correlation is used to calculate the required sensor shift—two images are captured, and the "shift" between the two images is calculated based on correlating the two images and determining the movement between the two images. Then the sensor is shifted to compensate for that calculated motion. It is important to note that our techniques taught herein do not require or use optical correlation or any other type of image analysis.

Our techniques include:

1) using the predicted orbit motion (which is very accurate) and using the image geometry (location of image relative to satellite) to calculate the sensor shift profile. This profile is then used to command the sensor shift mechanism to move in x, y, z, as needed, over the duration of the image capture (e.g., 15-30 milliseconds) to maintain a steady image attitude on the target. Real-time, closed-loop, motion compensation (via sensors or image correlation) is not needed. Rather, open loop calculation can be made using the highly accurate ephemeris already readily available to the satellite and the satellite-to-target geometry (which geometry is readily available). Orbit motion compensation is extremely predictable and accurate using ephemeris and image geometry.

2) using the on-board attitude and rate sensors (gyros, star trackers, and so forth) to calculate the error in attitude and rate from the desired attitude and rate. Rather than using maneuvering of the satellite to get these errors to within acceptable tolerances, we use the satellite maneuvering to get close, and then use sensor shift to fine-tune the reduction of these errors to within tolerance. The benefit is faster time to adjust the attitude from image to image.

While the embodiments have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

What is claimed is:

1. A remote sensing platform for imaging an area spaced apart from the remote sensing platform, the remote sensing platform comprising:
    a remote sensing platform body;
    an image sensor positioned on the remote sensing platform body and that moves in a first plane relative to the remote sensing platform body and including relative to movement of the remote sensing platform body, wherein the first plane is an x-y plane and the movement of the image sensor within the first plane is in response to and controlled by control signals;
    a controller that provides the control signals for movement of the image sensor relative to the remote sensing platform body, the control signals being based on movement of the remote sensing platform body relative to the area to be imaged, wherein, during image capture, the image sensor is movable by the control signals in the first plane relative to the remote sensing platform body and thereby including relative to movement of the remote sensing platform body in each one of and in any combination of along a straight line within the first plane, along a curved line within the first plane, and a rotational movement within the first plane;
    wherein the image sensor is an area array image sensor having a quantity of rows of pixels that is at least one-tenth of a quantity of pixels in each row of pixels; and
    wherein the controller is configured to move the image sensor through a sequence of positions within the first plane such that the image sensor captures an image of the same area in each of the positions.

2. The remote sensing platform of claim 1, wherein the remote sensing platform is an orbital satellite.

3. The remote sensing platform of claim 1, wherein calculation of the control signals is entirely free of being based on image correlation.

4. The remote sensing platform of claim 1, wherein calculation of the control signals is entirely free of being based on any captured image.

5. The remote sensing platform of claim 1, wherein the image sensor captures image data, and wherein the control signals are further based on a predicted orbital motion of the remote sensing platform body and the location of the captured image data relative to the remote sensing platform.

6. The remote sensing platform of claim 1, wherein the image sensor moves so as to compensate for motion of the remote sensing platform relative to the area to be imaged for at least 15 milliseconds.

7. The remote sensing platform of claim 1, wherein the movement of the image sensor along the curved line within the first plane compensates for at least one of off-nadir imaging or attitude error.

8. The remote sensing platform of claim 1, further comprising at least one location sensor that detects location data corresponding to at least one of a position or orientation of the remote sensing platform body, wherein the control signals are further based on the location data.

9. The remote sensing platform of claim 8, wherein the at least one location sensor includes a gyroscope and a GPS sensor.

10. The remote sensing platform of claim 8, further comprising a star tracker that detects star data corresponding to a location of the remote sensing platform relative to at least one star, wherein the control signals are further based on the star data.

11. A method for imaging an area spaced apart from a remote sensing platform, the method comprising:
    calculating, by a controller, a desirable movement pattern of an image sensor of the remote sensing platform relative to the area to be imaged based on movement of the remote sensing platform relative to the area to be imaged, the desirable movement pattern corresponding to the image sensor being movable during image capture and in a first plane relative to a remote sensing platform body and including relative to movement of the remote sensing platform body, wherein the first plane is an x-y plane and the image sensor is movable within the first plane in each one of and in any combination of along a straight line within the first plane, along a curved line within the first plane, and a rotational movement within the first plane;
    controlling, by the controller, the image sensor to move along the desirable movement pattern within the first plane;
    wherein the image sensor is an area array image sensor having a quantity of rows of pixels that is at least one-tenth of a quantity of pixels in each row of pixels; and
    wherein the controlling comprises moving the image sensor through a sequence of positions within the first plane such that the image sensor captures an image of the same area in each of the positions.

12. The method of claim 11, wherein the remote sensing platform is an orbital satellite.

13. The method of claim 11, wherein calculating the desirable movement pattern is entirely free of being based on image correlation and is entirely free of being based on any captured image.

14. The method of claim 11, wherein calculating the desirable movement pattern is further based on a predicted orbital motion of the remote sensing platform.

15. The method of claim 14, wherein calculating the desirable movement pattern is further based on a location of image data captured by the image sensor relative to the remote sensing platform.

* * * * *